United States Patent [19]

Enoto

[11] 4,453,166
[45] Jun. 5, 1984

[54] METHOD AND DEVICE FOR AVOIDING DEFECTIVE ELEMENTS IN A THERMAL PRINTER

[75] Inventor: Michio Enoto, Shiga, Japan

[73] Assignee: Kabushiki Kaisha Ishida Koki Seisakusho, Kyoto, Japan

[21] Appl. No.: 408,842

[22] Filed: Aug. 17, 1982

[30] Foreign Application Priority Data

Aug. 19, 1981 [JP] Japan .................................. 56-130477

[51] Int. Cl.³ ............................................. G01D 15/10
[52] U.S. Cl. ................................. 346/1.1; 346/76 PH
[58] Field of Search ........................... 364/76 PH, 1.1; 219/216; 400/140

[56] References Cited

U.S. PATENT DOCUMENTS 4,360,819 11/1982 Saito et al. ...................... 346/76 PH
4,415,908 11/1983 Sugiura ............................ 219/216 X Primary Examiner—George H. Miller, Jr.
Assistant Examiner—Todd E. DeBoer
Attorney, Agent, or Firm—Armstrong, Nikaido, Marmelstein & Kubovcik

[57] ABSTRACT

A method and device for avoiding defective elements in a thermal printer having a thermal head on which a greater number of heating elements than the number of bits in printing data are linearly continuously arranged, and an output register associated with the bits in the heating elements and adapted to deliver printing data for one line to the heating elements, wherein when some of the heating elements become defective, the printing data is shifted a suitable number either to the right or to the left so as to correspond to the non-printing bits in the printing data and is then transferred to the output register. According to the invention, in the case of, e.g., bar code printing, even if some of the heating elements become defective, printing can be continued without any trouble, so that great improvements in productivity and quality control can be achieved.

8 Claims, 7 Drawing Figures

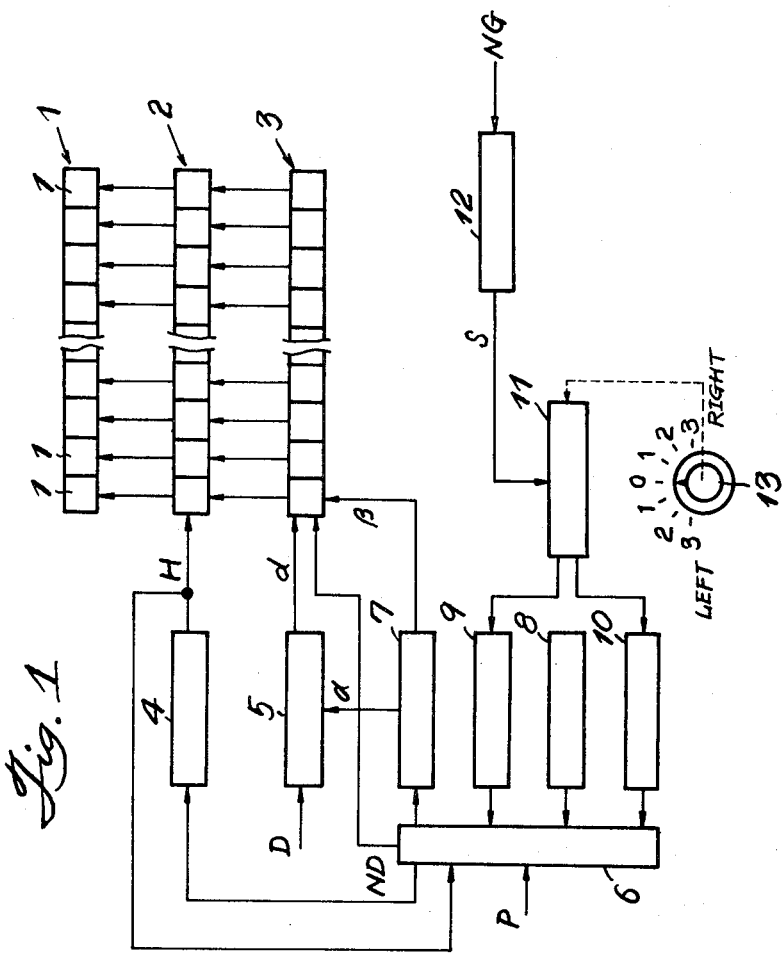

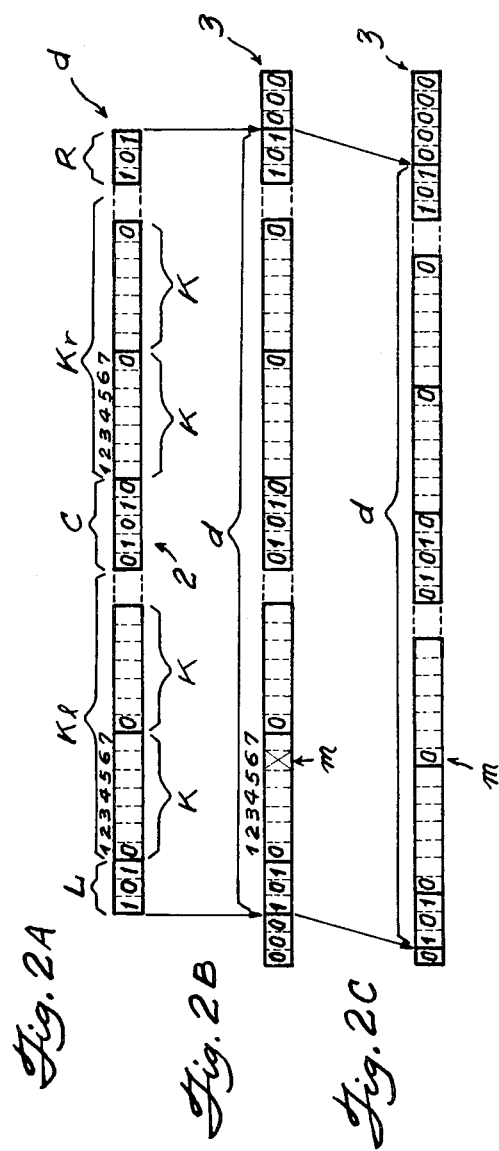

METHOD AND DEVICE FOR AVOIDING DEFECTIVE ELEMENTS IN A THERMAL PRINTER

The present invention relates to a method and device for avoiding defective elements in a thermal printer, wherein printing is allowed to continue without any trouble even when some of the heating elements of the thermal printer become defective.

A thermal printer has a plurality of heating elements linearly arranged on a thermal head, wherein heat-sensitive paper opposed to and contacted with the heating elements is moved with a predetermined pitch, and the heating elements are selectively heated according to printing data, thereby printing a predetermined pattern in color on the heat-sensitive paper. Thus, the most frequent accident to the thermal printer is defective heating due to the breaking of heating elements. The breaking of heating elements is ascribable to the facts that the heating elements gradually wear owing to friction with the moving heat-sensitive paper and that insufficient contact with the heat-sensitive paper results in burnout because the heat generated does not dissipate properly. When defective heating due to this breakage takes place, the portion of the heat-sensitive paper contacted with the defective heating elements does not develop color, so that printing is no longer effected or the printed pattern becomes difficult or impossible to read. If even one of the heating elements becomres defective, normal printing is no longer continued. Particularly in the case of bar code printing, if black bars are printed as white bars, entirely different data will be read out, making continuous use impossible. If a heating element becomes defective during printing operation, the operation will be interrupted, causing trouble to the retention of productivity and to quality control. The heating elements alone or in combination with the heating element drive section and output register are often packaged as a unit. As a result, even if a single heating element becomes defective, the heating element unit or all unit must be replaced, which is uneconomical.

Accordingly, the present invention is intended to provide an improved thermal printer capable of eliminating the drawbacks described above.

The present invention provides a method and device for avoiding defective elements in a thermal printer having a thermal head on which a greater number of heating elements than the number of bits in printing data are linearly continuously arranged, and an output register associated with the bits in the heating elements and adapted to deliver printing data for one line to the heating elements, wherein when some of the heating elements become defective, the printing data is shifted a suitable number in either direction so as to correspond to the non-printing bits in the printing data and is then transferred to the output register. Thereby, even if some of the heating elements become defective, the printing operation can be continued in normal condition. Thus, the invention improves the reliability in the use of the thermal printer and increases the working life of the thermal printer and provides economic merits.

These and other objects and features of the invention will become more apparent from the following description to be given with reference to the accompanying drawings, in which:

FIG. 1 is a block diagram of a concrete example of a device embodying the present invention;

FIG. 2-A shows an example of the arrangement of printing data;

FIG. 2-B shows the printing data read into an output register;

FIG. 2-C shows the printing data shifted 2 to the left and read into the output register;

FIGS. 3-A, 3-B and 3-C show a data shift process in which the printing data is shifted 2 to the left as it is received in the output register.

The principle of the invention for providing normal printing by avoiding defective elements will first be described.

In the case of bar code printing, bar codes are usually printed in UPC (Universal Product Code) bar code format. A UPC code, as shown in FIG. 2-A, is made of a plurality of modules each consisting of a black bar or a white bar (a black bar being represented by "1" and a white bar by "0" in the drawings), these modules being arranged with a constant pitch; it comprises a left guide bar L and a right guide bar R at opposite ends each consisting of three black-white-black modules, a center bar C in the middle consisting of five white-black-white-black-white modules, and 12 or 8 characters K each consisting of 7 modules to represent one bit of data. The positions of the black and white bars in each character K consisting of 7 modules, of course, differ with the numerals represented thereby, but each of the characters Kl on the left-hand side of the center bar C has its first module composed of a white bar, while each of the characters Kr on the right-hand side has its seventh module composed of a white bar. With this arrangement, the positions of the modules which always take white bars in the entire bar code can be easily found, it being noted that these positions are always spaced at intervals of less than 7 modules. With attention paid to this fact, if a defective element which fails to heat shifting 3 modules or less to the left or right will enable the defective heating element to correspond to a white bar position. For example, as shown in FIG. 2-B, assume that to a greater number of heating elements than the number of bits in printing data d there corresponds an output register 3 with the same number of bits and that the output register is being used in such a manner that there are 3 excess bits at each end. In this case, printing data to be transferred to the output register 3 is shifted 2 to the left and imparted thereto, as shown in FIG. 2-C. Then, it follows that to data transferred from this output register to defective heating elements there always correspond white bars. For this reason, it becomes possible to continue the printing operation without having to replace the thermal head or thermal printer in its entirety.

In addition, in the case of the printing of characters such as numerals and letters, too, since one module or two modules of white spaces are prepared for each character, it can be seen that by utilizing this fact, defective elements can be avoided in the same manner as in the case of the bar code printing.

A device for embodying the present inventive method will now be described.

In FIG. 1, the numeral 1 denotes a plurality of heating elements linearly arranged on a thermal head, which are of the general type wherein their number is at least 6 bits greater than the number of bits in printing data. The numeral 2 denotes a heating element driving section comprising driving elements, such as driver transistors or the like, equal in number to and respectively associated with the heating elements; 3 denotes an output register having the same number of bits in the heating element driving section 2; 4 denotes a heating timing signal generating section; 5 denotes a data generating section which receives printing data D including article code and price, converts it to printing data d of predetermined format and transfers it to the output register 3; 6 denotes a control section which, when receiving a printing instruction signal P, transfers the printing data d from the data generating section 5 to the output register 3 in such a condition that the data is shifted a suitable number to the right or left so as to avoid defective elements, and gives heating and printing instructions; 7 denotes a shift pulse generating section for delivering shift pulses α and β to the data generating section 5 and output register 3 on the basis of the instructions from the control section 6; 8 denotes a module counter in which the number of modules in the printing data d is stored and set; 9 denotes a right-hand side element counter for storing the number of non-heating elements on the right-hand side in the heating elements 1; 10 denotes a left-hand side element counter for storing the number of non-heating elements on the left-hand side in the heating elements 1; 11 denotes a counter control section for setting count numbers for the right-hand side and left-hand side counters 9 and 10 according to the shift number of the printing data in such a manner that the sum of the count numbers for the module counter 8 and right-hand side and left-hand side counters 9 and 10 is equal to the number of bits in the output register 3; 12 denotes a shift number calculating section for calculating the rightward or leftward shift number of the printing data to be transferred to the output register 3 according to the positions of defective heating elements 1; and 13 denotes a shift number manual setting switch for manually setting rightward or leftward shift numbers.

The operation of the device will now be described.

The module counter 8 has the number of bits in the printing data d shown in FIG. 2-A set therein as a constant value. In addition, as for the number of bits, where the number of characters is 12, the number of bits corresponding to the characters is 12×7=84, the number corresponding to the right and left guide bars is 3×2=6, and the number corresponding to the center bar is 5: the sum is 95. The number of heating elements is 6 bits greater than the sum, being 101. Assuming that there is no defective heating element, the count numbers set and stored in the right-hand side and left-hand side element counters 9 and 10 to be controlled by the counter control section 11 are each 3. To effect the printing of the printing data in this condition, the printing data D is transferred to the data generating section 5 and converted into predetermined data d and stored therein and then a printing instruction signal P is transferred to the control section 6. The latter then delivers a "0" output from its nonprinting data terminal ND to the series input terminal of the output register 3, while the shift pulse generating section 7 delivers three shift pulses β corresponding to the count value of three for the right-hand side element counter 9 to the output register 3. Thus, "0" is read into the 3 bits on the left-hand side of the output register 3. Subsequently, the delivery of the output from the non-printing data terminal ND is stopped, and shift pulses α and β corresponding in number to the count value of ninety five for the module counter 8 are delivered from the shift pulse generating section 7 to the data generating section 5 and output register 3. Then, the printing data d with ninety five bits as shown in FIG. 2-A generated in the data generating section 5, starting at the initially inputted "0" data with three bits, is successively transferred to the output register 3 at its right-hand side. The control section 6 then delivers a "0" output from the non-printing data output terminal ND to the series input terminal of the output register 3, while causing the shift pulse generating section 7 to deliver three shift pulses β corresponding to the count value of 3 for the left-hand side element counter 10 to the output register 3. Therby, the previously inputted "0" data with three bits is read into the positions of three bits as counted from the right-hand side of the output register 3, and the data d with ninety five bits is successively read in and the "0" data with three bits is read into the positions of three bits which follow up to the left-hand end, so that the stored contents of the output register 3 are as shown in FIG. 2-B. The control section 6 then controls the heating timing signal generating section 4 to impart a heating timing signal H to the heating element driving sections 2. In the case of bar code printing, this heating timing signal H consists usually of a series of intermittent 3 to 4 ms pulses, and each pulse renders the heating element driving section 2 conductive for 3 to 4 ms, causing heating element 1 which correspond to "1" in the parallel outputs from the output register 3 to generate heat. For each heat generation by a pulse, a colored point is formed on the heat-sensitive paper contacted with the heating elements 1, and the heat-sensitive paper is fed one pitch. Since the printing data delivered from the output register 3 does not change during the generation of the pulse series of heating timing signals H, upon completion of generation of the pulse series of heating timing signals H black bars resulting from a collection of colored points are printed on the heat-sensitive paper. When color development and printing for one operation are completed in this manner, the control section 6 detects the absence of heating timing signals H to complete the color development and printing for one operation and waits for the next printing instruction signal P.

Assume that one of the heating elements 1 becomes defective and fails to heat during such color development and printing. Then, normal color development and printing can be continued by avoiding the defective heating element in the following manner: When one of the heating elements 1 becomes defective and fails to heat, a defective element position detection signal NG is delivered from a defective heating element detecting section (not shown) to the shift number calculating section 12. The latter calculates the shift number to avoid the defective element in, e.g., the following procedure: First, it judges which position the defective element takes in the right guide bar R, right-hand side characters Kr, center bar C, left-hand side characters, or left guide bar L.

If this position is in the right guide bar R, center bar C or left guide bar L, there will be no shift signal S delivered if the defective element corresponds to the "0" data (white bar), but if it corresponds to the "1" data (black bar), a shift signal S for shift one to the right (or to the left) will be generated. It must be so arranged, however, that this shift will not cause the defective element to be away from the position of the right guide bar R, center guide bar C or left guide bar L.

If the position of the defective element is in the left-hand side characters Kl, from the position X of the defective element as counted from the left end there are subtracted the number three of the non-heating elements at the left end and then the number three for the left guide bar L, the result being then divided by seven to find the remainder, from which it can be found to which position in one character the defective element corresponds. If it is at the first position, this means that it corresponds to "0" data (white bar), so that no shift signal will be delivered. If it is at the 2nd to 4th position, a shift signal S for shift one to three to the right will be delivered to the counter control section 11. Further, if it is at the 5th to 7th position, a shift signal S for shift three to one to the left will be delivered to the counter control section 11.

If the position of the defective element is in the right-hand side character Kr, from the position X of the defective element as counted from the left and there are subtracted the number three of the non-heating elements at the left end, the number three for the left guide bar L, the number seven multiplied by six for the left-hand side characters Kl and the number five for the center guide bar C, the result being divided by seven to find the remainder, from which it can be found to which position in one character the defective element corresponds. If it is at the 1st to 3rd position, a shift signal S for shift one to three to the right will be delivered to the counter control section 11. If it is at the 4th to 6th position, a shift signal S for shift 3 to 1 to the left will be delivered to the counter control section 11. If it is at the 7th position, no shift signal S will be delivered.

The shift signal S thus calculated and delivered so as to correspond to the position of the defective element causes the counter control section 11 to set the count values for the right-hand side and left-hand side element counters 9 and 10 in the following manner: In the case of a shift n to the right, the number n is subtracted from the count value for the right-hand side element 9 and is added to the count value for the left-hand side element counter 10. In the case of a shift n to the left, the number n is added to the count value for the right-hand side element counter 9 and is subtracted from the count value for the left-hand side element counter 10. Such addition and subtraction do not change the sum of the count values for the right-hand side counter 9, module counter 8 and left-hand side element counter 10, the sum being equal to the number of bits in the output register 3 shown in FIG. 2-B.

When the control section 6, in the foregoing procedure, causes the output register 3 to read in the printing data according to the count values set in the right-hand side and left-hand side element counter 9 and 10, it follows that the data read into the output register 3 has been shifted a suitable number to the right or left so as to avoid the defective element.

As actual example in which a defective element is avoided will now be described.

Assume that a defective element is detected by the defective heating element detecting section, that the position of the defective heating element is inputted into the calculating section 12, which then performs a predetermined operation, and that, as a result, a shift signal S for shifting bar code printing positions two to the left has been delivered to the counter control section 11. In this case, two is added to the value for the right-hand side element counter 9 to change the value to five while subtracting two from the value for the left-hand side element counter 10 to change the value to one. The printing control operation to be performed in this condition is as follows.

First, when the printing data D is read into the data generating section 5 and a printing instruction signal P is transferred to the control section 6, the latter delivers a "0" output from its non-printing data terminal ND to the series input terminal of the output register 3 and causes the shift pulse generating section 7 to deliver five shift pulses β corresponding to the count value five for the right-hand side element counter 9 to the output register 3. Then, as shown in FIG. 3-A, "0" is read into each of the five bits on the left side of the output register 3. Subsequently, the output from the non-printing data terminal ND is stopped, and shift pulses α and β corresponding to the count value ninety five for the module counter 8 are delivered from the shift pulse generating section 7 to the data generating section 5 and output register 3. Then, starting at the initially inputted "0" data with five bits, the printing data d with ninety five bits generated in the data generating section 5 is transferred in order into the output register 3, as shown in FIG. 3-B. The control section 6 then delivers a "0" output from the non-printing data terminal ND to the series input terminal of the output register 3 and causes the shift pulse generating section 7 to deliver one shift pulse β corresponding to the count value one for the left-hand side element counter 10 to the output register 3. As a result, as shown in FIG. 3-C, the previously read-in "0" data with five bits is read into the positions of five bits as counted from the right end of the output register 3 and, following this, the printing data with ninety five bits is read in, followed by the "0" data with one bit being read in at the left end. Thereafter, the control section 6 controls the heating timing signal generating section 4 to effect color development and printing for one operation, in the same procedure as described above. The resulting printed pattern is satisfactory, being such that the defective element corresponds to the non-printing bit in the printing data. In addition, as a result of shifting the printing data to the right or left, the printed pattern has some positional deviation to the right or left from the normal position, but since one module is usually 0.33 mm, even in the case of a three-bit shift is at a maximum the deviation is about 1 mm, causing no trouble from a practical viewpoint.

In addition, the provision of the shift number manual setting switch 13 makes it possible to manually set leftward or rightward shift numbers in the counter control section 11. It is used in cases where a test printing pattern is actually printed on heat-sensitive paper and there is a bit which fails to develop color; thus, in this case, the shift number is determined so that the non-printing bit in the printing data corresponds to that position and the dial on the shift number manual setting switch 13 is set. If the device is so arranged that the number of right-hand side elements which is the number of non-printing bits at the right end of the printing data and the number of left-hand side elements which is the number of non-printing bits at the left end are directly set in the control section 6 by using digital switches, then the left-hand side element counter 10, counter control section 11 and shift number calculating section 12 become unnecessary.

In the case of bar code printing, it is usual practice that such numerals as are represented by the characters of bar code are printed under the bar code. However, since these numerals are printed by using the 2nd to 6th modules in one character, avoidance of the printing bits of bar code from a defective element results in these numerals being also avoided from the defective element, so that, of course, there is no trouble to the printing of these numerals.

While the output register 3 used in the embodiment described above is a shift register, it is also possible to use a register adapted for parallel input and output. Further, the right-hand side and left-hand side element counters 9 and 10 and module counter 8 may be registers.

As many apparently widely different embodiments of the invention may be made without departing from the spirit and scope thereof, it is to be understood that the invention is not limited to the specific embodiment thereof except as defined in the appended claims.

What is claimed is:

1. A method of avoiding defective elements in a thermal printer having a thermal head on which a greater number of heating elements than the number of bits in printing data are linearly arranged, and an output register for delivering printing data for one line to the heating elements, wherein when some of the heating elements become defective, the printing data is shifted a suitable number in either direction so as to cause the defective elements to correspond to the non-printing bits in the printing data and is fed into the output register.

2. A method as set forth in claim 1, wherein when some of the heating elements become defective, the printing data is shifted not more than three modules to the right or left to cause the defective heating elements to correspond to the non-printing bits in the printing data and is fed into the output register.

3. In a device for avoiding defective elements in a thermal printer having a thermal head on which a greater number of heating elements than the number of bits in printing data are linearly arranged, a heating element driving section including driving elements equal in number to and respectively associated with said heating elements, and an output register having the same number of bits as said heating elements, the improvement comprising:

a heating timing signal generating section, a data generating section which receives printing data, converts it into printing data of predetermined format and delivers it to said output register, a control section which, when receiving a printing instruction signal, transfers the printing data from said data generating section to said output register in such a condition that said printing data is shifted a suitable number to the left or right so as to avoid defective elements, a shift pulse generating section for delivering shift pulses to said data generating section and output register according to instructions from said control section, a module counter for storing and setting the number of modules in printing data, a right-hand side element counter for storing the number of non-heating elements on the right side of said heating elements, a left-hand side counter for storing the number of non-heating elements on the left side of said heating elements, a counter control section for setting count numbers for the right-hand side and left-hand side element counters according to the number that the printing data is shifted so that the sum of the count numbers for the module counter, and right-hand side and left-hand side element counters is equal to the number of bits in the output register, and a shift number calculating section whereby the number the printing data to be fed into said output register is to be shifted to the right or left is calculated according to the position of a defective heating element.

4. A device as set forth in claim 3, wherein the number of said heating elements is six bits greater than the number of bits in printing data.

5. A device as set forth in claim 4, wherein the right-hand side and left-hand side element counters, counter control section, and shift number calculating section are replaced by digital switches, and the number of right-hand side elements which is the number of non-printing bits at the right end of printing data and the number of left-hand side elements which is the number of non-printing bits at the left end are directly set in said control section.

6. A device as set forth in claim 3, wherein said output register is a shift register.

7. A device as set forth in claim 3, wherein said output register is a register adapted for parallel input and output.

8. A device as set forth in claim 3, wherein the left-hand side and right-hand side element counters and module counter are replaced by registers.

* * * * *